(12) United States Patent
Mugura et al.

(10) Patent No.: US 6,222,921 B1
(45) Date of Patent: Apr. 24, 2001

(54) METHOD AND APPARATUS FOR DISPLAYING AN ELECTRONIC PHONEBOOK

(75) Inventors: Katzuto Mugura, Kawasaki (JP); Bryan Lew Fong, San Diego; Chris Shi-Chai Liu, San Jose, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/133,070

(22) Filed: Aug. 12, 1998

(51) Int. Cl.[7] .................................................. H04M 1/00
(52) U.S. Cl. ...................... 379/354; 379/355; 379/356; 379/216
(58) Field of Search .................... 379/354, 355, 379/356, 216, 201, 202

(56) References Cited

U.S. PATENT DOCUMENTS

| 4,908,853 | 3/1990 | Matsumoto | 379/355 |
|---|---|---|---|
| 5,303,288 | 4/1994 | Duffy et al. | 379/59 |
| 5,349,629 | 9/1994 | Kumano | 379/58 |
| 5,371,788 | 12/1994 | Baals et al. | 379/396 |
| 5,483,591 | 1/1996 | Koma | 379/356 |
| 5,592,546 | 1/1997 | Takahashi | 379/355 |
| 5,724,410 | 3/1998 | Parvulescu et al. | 379/88 |
| 5,901,217 | 5/1999 | Kanbar | 379/355 |
| 6,041,325 | * 3/2000 | Shah et al. | 707/10 |
| 6,047,054 | * 4/2000 | Bayless et al. | 379/202 |

* cited by examiner

*Primary Examiner*—David Hudspeth
*Assistant Examiner*—Susan Wieland
(74) *Attorney, Agent, or Firm*—Crosby, Heafey, Roach & May

(57) ABSTRACT

An apparatus and method for displaying a telephone directory. A main menu is used to display the names of a telephone directory, and each of the names is associated with a primary number. A sub menu is used to display the numbers associated with each of the names in the main menu. The primary number is denoted and automatically selected in the second menu.

47 Claims, 5 Drawing Sheets

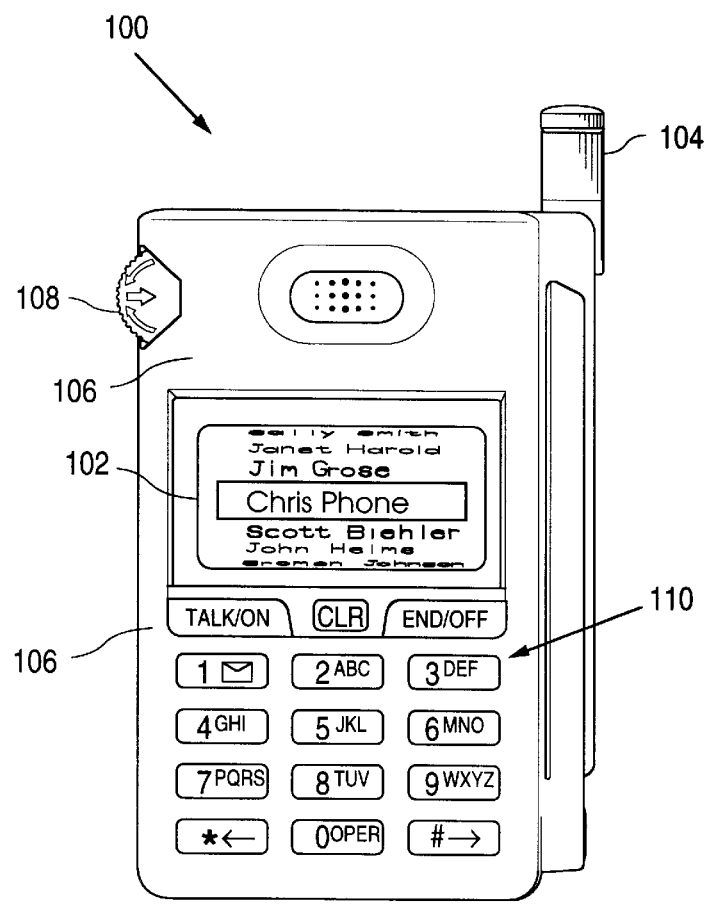 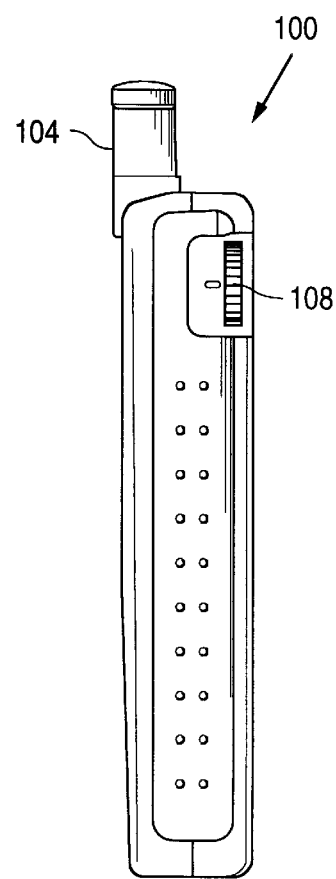
FIG. 1A  FIG. 1B

METHOD AND APPARATUS FOR DISPLAYING AN ELECTRONIC PHONEBOOK

BACKGROUND OF THE INVENTION

1. Field of the Invention

This invention relates generally to displaying a name directory on a screen, and, more specifically, to displaying a name directory containing a plurality of directory names with each of them being associated with a plurality of numbers.

2. Related Art

A state of art telephone has the capability of storing a telephone directory containing a plurality of names, and displaying these names on the display screen of the telephone. Frequently, a name in a telephone directory may contain several numbers (including a home number, an office number, a fax number, a page number, and a cellular number, for example). Using control buttons on the control panel of a telephone, a user can select a number from a telephone directory to dial the selected number.

Conventionally, a typical available telephone displays all names and the associated numbers of a telephone directory together on a display screen. Such an approach makes it difficult for a user to locate a number of interest from the display screen, because the user may see several numbers under an identical name. Furthermore, when a telephone directory is displayed on a relatively small region, such as an LCD screen on a cellular telephone, it is even more difficult for a user to locate a particular number of interest.

There is, therefore, a need for a method and apparatus to display a plurality of names, which facilitates a user to select a specific number from the multiple numbers associated with the names.

There is another need for a method and apparatus to display a plurality of names on a relatively small display region, which facilitates a user to select a specific number from the multiple numbers associated with the names.

The present invention provides a method to meet these two needs.

SUMMARY OF THE INVENTION

The present invention provides a novel method and a corresponding apparatus to display a telephone directory.

To address the shortcomings of the available art, the present invention provides a novel method for displaying a telephone directory. The method comprises the steps of: on a first display screen, displaying a plurality of names, each of the names being associated with a primary number; from the first display screen, selecting one of the names; on a second display screen, displaying a primary number associated with the selected name and at least one secondary number; and on the second display screen, automatically selecting the primary number.

The present invention also provides an apparatus capable of performing the steps in the method described above.

The foregoing and other features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1A is the front view of a cellular telephone, which can be used to implement the present invention;

FIG. 1B is the side view of the cellular telephone shown in FIG. 1A;

DETAILED DESCRIPTION OF THE PREFERRED EMBODIMENTS

Figure 2:
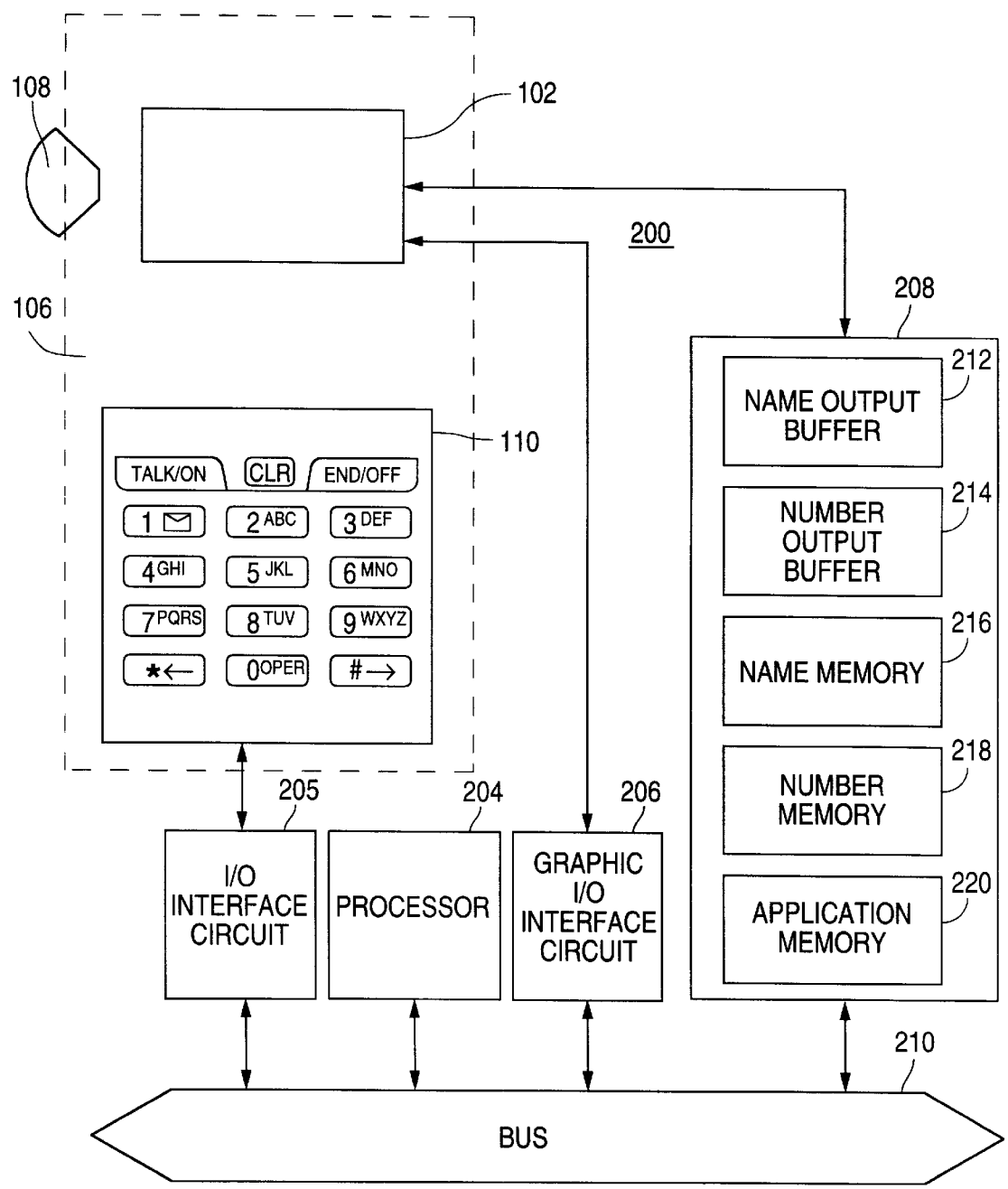
FIG. 2 is a block diagram illustrating some components of the cellular telephone shown in FIG. 1A.

Referring to FIG. 1A, there is shown the front view of a cellular telephone 100, which can be used to implement the present invention.

As shown in FIG. 1A, the cellular telephone 100 includes a display screen 102, an antenna 104, and a control panel 106. The control panel 106 includes a jog dial wheel 108 and a key panel 110 including twelve alpha/numeric keys (1, 2, 3, 4, 5, 6, 7, 8, 9, *, 0, and #). The jog dial wheel 108 can be moved in three directions (turn-up, turn-down, and press-in) as indicated by the three arrows. The menu items displayed on the display screen 102 can be scrolled up and down by turning the jog dial wheel 108 up and down, respectively. And a selected menu item displayed on the display screen 102 can be activated by pressing in the jog dial wheel 102.

Referring to FIG. 1B, there is shown the side view of the cellular telephone 100 to illustrate the side view of the jog dial wheel 108.

Referring to FIG. 2, there is shown a block diagram 200, illustrating some components of the cellular telephone 100 shown in FIG. 1A, in accordance with the present invention.

As shown in FIG. 2, the block diagram 200 includes a processor 204, an I/O (input and output) interface circuit 205, a graphic I/O interface circuit 206, a memory 208, and a bus 210.

The processor 204, the I/O interface circuit 205, the graphic I/O interface circuit 206, and the memory 208 are all coupled to the bus 210.

The memory 208 includes: (1) a name output buffer 212 for storing directory names to be displayed, (2) a number output buffer 214 for storing the numbers to be displayed, (3) a name memory 216 for storing the directory names, (4) a number memory 218 for storing the numbers associated with the directory names, and (5) an application memory 220 for storing an application that includes a data entry routine, a display routine, and a dialing routine.

The processor 204 controls the operations of the I/O interface circuit 205, the graphic the I/O interface circuit 206, the memory 208, and the display region 102. More specifically, the processor 204 is able to: (1) get access to the data stored in the name output buffer 212, the number output buffer 214, the name memory 216, and the number memory 218, (2) execute the application stored in the application memory 220, (3) interact with the control panel 106 via the I/O interface circuit 205, and (4) display the data stored in the output buffers 212 and 214 on the display region 102 via the graphic I/O interface circuit 206. All these operations are performed in a conventional manner, except as otherwise described herein.

Since to the cellular system 100, the display screen 102 is an output mechanism, the name output buffer 212 and the number output buffer 214 are especially set to store the data to be displayed on the display screen 102.

Using the jog dial wheel 108, a user can invoke the data entry routine (stored in the application memory 20). And using the nine alpha/numeric keys on the key panel 110, a user can input names to the name memory 216 and numbers to the number memory 218. The names and numbers can then be loaded from the name memory 216 and the number memory 218 to the name output buffer 212 and the number output buffer 214, respectively. A name may associate with several numbers. Among the several numbers, the user can define a primary number for the name.

Figure 3:
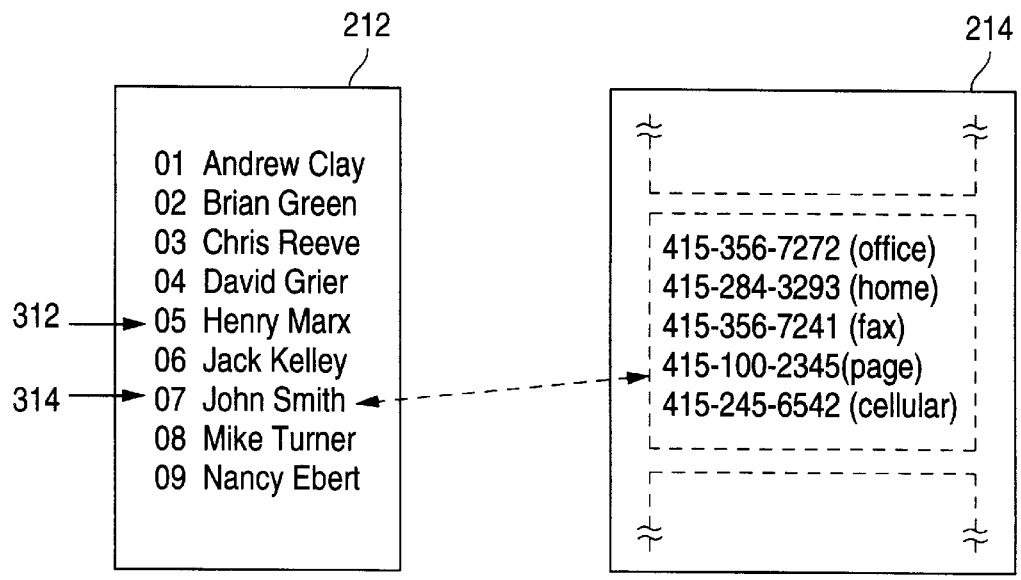
FIG. 3 shows the steps illustrating a sequence of displays on a display region, in accordance with one embodiment of the present invention.

Referring to FIG. 3, there is shown a name directory stored in the name output buffer 212 and the number output buffer 214, in accordance with the present invention.

As shown in FIG. 3, the name output buffer 212 stores nine names. The number output buffer 214 stores the numbers associated with each of the nine names stored in the name output buffer 212. In particular, FIG. 3 shows that the number output buffer 214 stores five numbers that are associated with the seventh name (07 John Smith) stored in the name output buffer 212.

Since the display screen 102 has a relatively small area, not all the data items stored in the name output buffer 212 or the number output buffer 214 can be displayed on the display screen 102 at a certain point of time. Hence, a start pointer and an end pointer are set to mark an active section in the name output buffer 212 (or in the number output buffer 214). Even though all the data items stored in the name output buffer 212 (or in the number output buffer 214) are linked with the display screen 102, only the data items contained in the active section are being displayed on the display screen at a certain point of time. In the embodiment shown in FIG. 3, for the name output buffer 212, a start pointer 312 points to the fifth name (05 Henry Marx), and an end pointer 314 points to the seventh name (07 John Smith). Hence, the active region of the name output buffer 212 contains three names (05 Henry Marx, 06 Jack Kelley, and 07 John Smith). When the start and end pointers 312 and 314 are moved down or up by turning up or down the jog dial wheel 108, the active section of the name output buffer 212 is also being moved up or down, causing the names stored in the name output buffer 212 to scroll up or down on the displaying screen 102 accordingly.

Referring to FIGS. 4A–E, there are shown the screen displays on display screen 102, in accordance with the present invention.

Figure 4A:
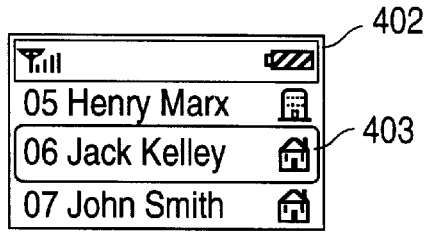
FIGS. 4A–E show the steps illustrating a sequence of displays on a display region, in accordance with another embodiment of the present invention.

FIG. 4A shows a screen display 402 on the display screen on 102, corresponding to the active region marked by the start pointer 312 and the end pointer 314 shown in FIG. 3. As shown in FIG. 4A, the screen display 402 includes three names (05 Henry Marx, 06 Jack Kelley, and 07 John Smith). An icon is displayed beside each of the names, denoting a primary number for a respective name. Specifically, the building icon beside "05 Henry Marx" denotes that the office number is the primary number for Henry Marx. The house icons beside "06 Jack Kelley" and "07 John Smith" denote that the home numbers are the primary numbers for Jack Kelley and John Smith. The rectangle in the middle of the display screen 102 indicates a selecting region 403, meaning that the name displayed in the selecting region 403 is currently selected. In FIG. 4A, the screen display 402 indicates that "06 Jack Kelley" is selected.

Figure 4C:
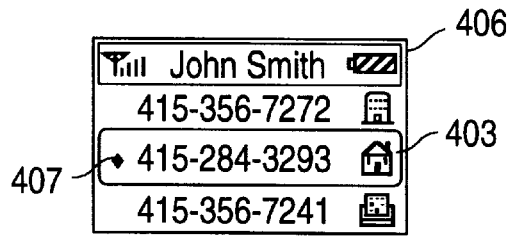
Figure 4B:
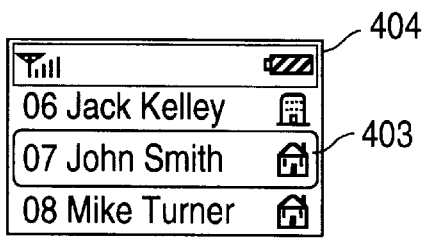

FIG. 4B shows a screen display 404 time sequentially to the screen display 402 of FIG. 4A. To select the name "07 John Smith", a user turns up the jog dial wheel 108 while the screen display 402 is being displayed on display screen 102. In response, the control panel 106 sends a request to the processor 204 via the I/O interface circuit 205. In response to the request, the processor 204 executes the display routine (stored in the application memory 220) to move the start pointer 312 from "05 Henry Marx" to "06 Jack Kelley", and the end pointer 314 from "07 John Smith" to "08 Mike Turner". Consequently, the name entry "05 Henry Marx" is moved out and the name entry "08 Mike Turner" is moved into the active section of the name output buffer 212. Via the graphic I/O interface circuit 206, the processor 204 then displays the names currently contained in the active section of the name output buffer 212, as shown in the display screen 404.

FIG. 4C shows a screen display 406 time sequentially to the screen display 404 of FIG. 4B. To retrieve the numbers associated with the name "07 John Smith", the user presses in the jog dial wheel 108 while the screen display 404 is being displayed on the display screen 102. In response, the control panel 106 sends a request to the processor 204 via the I/O interface circuit 205. In response to the request, the processor 204 executes the display routine (stored in the application memory 220) to retrieve the numbers associated with the name entry "07 John Smith" from number output memory 214. Since the home number of John Smith has been defined as a primary number, the processor 204 automatically displays the home telephone number (510-284-3292) in the selecting region 403 without requiring any interaction from the user. As shown in the screen display 406, a dot 407 denotes that the home telephone number is the primary number. To dial the primary number, the user simply presses in the jog dial wheel 108 on the control panel 106. In response, the processor 204 executes the dialing routine (stored in the application memory 220) to generate a dialing signal for the primary number.

Figure 4D:
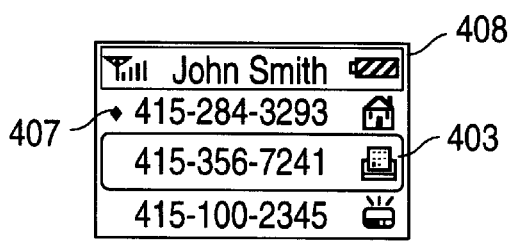

FIG. 4D shows a screen display 408 time sequentially to the screen display 406 of FIG. 4C. To select the fax number "415-356-7241", a user turns up the jog dial wheel 108 while the screen display 406 is being displayed on display screen 102. In response, the control panel 106 sends a request to the processor 204 via the I/O interface circuit 205. In response to the request, the processor 204 executes the display routine (stored in the application memory 220) to move the fax number "415-356-7241" to the selecting region 403. To dial the fax number, the user then presses in the jog dial wheel 108 on the control panel 106. In response, the processor 204 executes the dialing routine (stored in the application memory 220) to generate a dialing signal for the fax number.

Figure 4E:
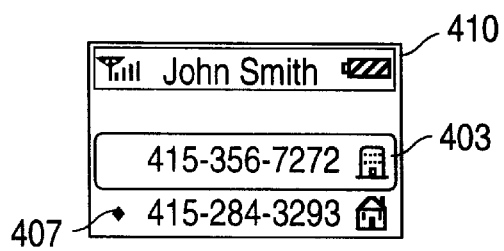

FIG. 4E shows a screen display 410 time sequentially to the screen display 406 of FIG. 4C. To select the office number "415-356-7272", a user turns down the jog dial wheel 108 while the screen display 406 is being displayed on the display screen 102. In response, the control panel 106 sends a request to the processor 204 via the I/O interface circuit 205. In response to the request, the processor 204 executes the display routine (stored in the application memory 220) to move the office number "415-356-7272" to the selecting region 403. To dial the office number, the user then presses in the jog dial wheel 108 on the control panel 106. In response, the processor 204 executes the dialing routine (stored in the application memory 220) to generate a dialing signal for the office number.

Figure 5:
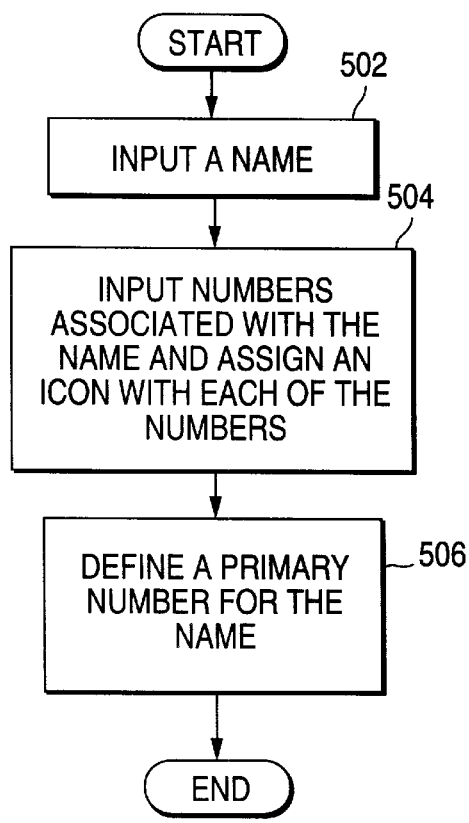
FIG. 5 shows a flowchart illustrating the steps of entering a name and the numbers that are associated with the name into the cellular telephone, in accordance with the present invention.

Referring to FIG. 5, there is shown a flowchart illustrating the steps of entering a name and the numbers that are associated with the name into the cellular telephone 100, in accordance with the present invention.

As shown in FIG. 5, at step 502, in response to a data entry menu selection from the display screen 102, the processor 204 executes the data entry routine (stored in the application memory 220) to display a prompt on the display screen 102, instructing a user to enter a name to the cellular telephone 100. Upon receiving the name entered by the user using the alpha/numeric keys on the key panel 110, the processor 204 stores the name to the name memory 216.

At step 504, the processor 204 executes the data entry routine (stored in the application memory 220) to display a prompt on the display screen 102, repeatedly instructing the user to input the numbers that are associated with the name. Upon receiving a number, the processor 204 also display a prompt on the display screen 102, instructing the user to input the title for the number (such as home, office, fax, pager, or cellular). Upon receiving the title of the number, the processor 204 assigns a pre-designed icon (that matches the title) to the number. Upon receiving all the numbers that are associated with the name, the processor 204 stores the number into the number memory 218.

At step 506, in response to a display menu selection from the display screen 102, the processor 204 executes the data entry routine (stored in the application memory 220) to display a prompt on the display screen 102, instructing the user to defme a primary number for the name. Upon receiving a definition input from the user, the processor 204 associates the primary number and the associated icon with the name.

Figure 6:
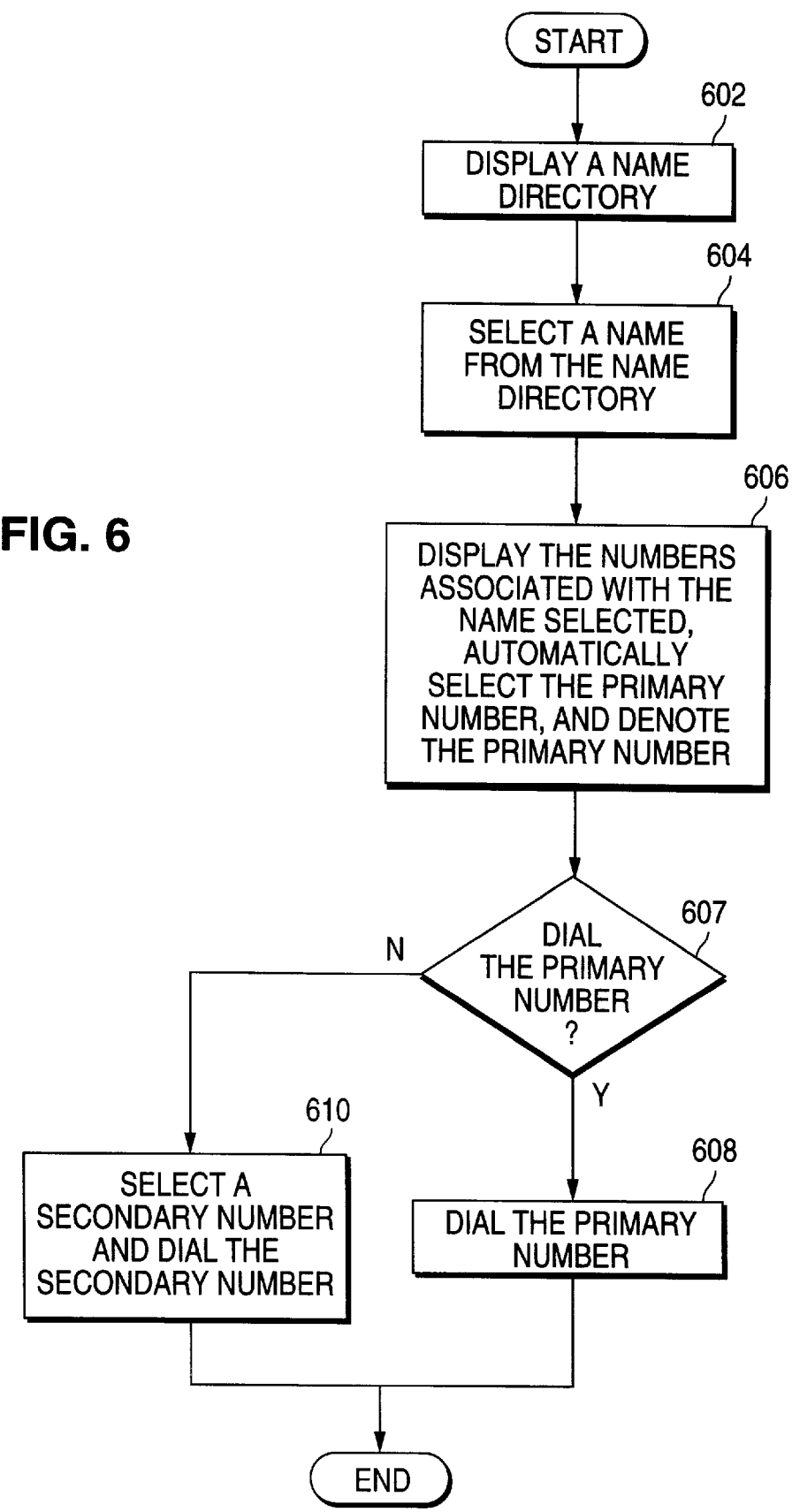
FIG. 6 shows a flowchart illustrating the steps of displaying the numbers that are associated with a name in a name directory, in accordance with the present invention.

Referring to FIG. 6, there is shown a flowchart illustrating the steps of displaying the numbers that are associated with a name in a name directory, in accordance with the present invention.

As shown in FIG. 6, at step 602, the processor 204 executes the display routine (stored in the application memory 220) to present a screen display for a name directory on the display screen 102. The screen display contains a selecting region and a plurality of name entries. As an exemplary screen display 404, FIG. 4B shows a name directory containing a selecting region 403 and three names (06 Jack Kelley, 07 John Smith, and 08 Mike Turner). The name "07 John Smith" is displayed within the selecting region 403.

At step 604, a user activates the name entry "07 John Smith" by pressing in the jog dial wheel 108.

At step 606, in response to the activation, the processor 204 executes the display routine (stored in the application memory 220) to retrieve the number entries associated with the name entry "07 John Smith" from the number output memory 214 and display them on a screen display. As an example, FIG. 4C shows the screen display 406 containing a selecting region 403 and three number entries (415-365-7272 (office), 415-284-3293 (home), and 415-327-7241 (fax)). Each of the three number entries is associated with an icon, and the dot 407 displayed beside the number entry "415-284-3293" denotes that the number entry is a primary number. Since the home number is defined as the primary number for the name entry "07 John Smith", the processor 204 automatically displays it in the selecting region 403 without requiring any interaction from the user. Following the step 606, the user has two options. If the user wishes to dial the primary number, the operation is led to step 608; if the user wishes to dial a secondary number, the operation is led to step 610.

At step 608, to dial the primary number, the user simply presses in the jog dial wheel 108 on the control panel 106, which in turn sends a request to the processor 204. In response to the request, the processor 204 executes the dialing routine (stored in the application memory 220) to generate a dialing signal for the primary number.

At step 610, to dial the fax number (415-356-7241), the user first turns up the jog dial wheel 108 to move the fax number into the selecting region 403 (as shown in FIG. 4D). The user then presses in the jog dial wheel 108, which in turn generates a request to the processor 204. In response to the request, the processor 204 executes the dialing routine (stored in the application memory 220) to generate a dialing signal for the fax number.

As an alternative, at step 610, to dial the office number (415-356-7272), the user first turns down the jog dial wheel 108 to move the office number into the selecting region 403 (as shown in FIG. 4E). The user then presses in the jog dial wheel 108, which in turn generates a request to the processor 204. In response to the request, the processor 204 executes the dialing routine (stored in the application memory 220) to generate a dialing signal for the office number.

Although the present invention has been shown and described with respect to preferred embodiments, various changes and modifications are deemed to lie within the spirit and scope of the invention as claimed.

What is claimed is:

1. A method for displaying a directory, comprising the steps of:
   (a) displaying a plurality of names on a first screen display, each of the names being associated with a primary number;
   (b) selecting one of the names from the first screen display;
   (c) displaying a primary number associated with the selected name and at least one secondary number on a second screen display; and
   (d) automatically selecting the primary number from the second screen display.

2. The method of claim 1, including the further step of: displaying a primary number icon for each of the names.

3. The method of claim 1, including the further step of: highlighting the primary number.

4. The method of claim 1, including the further step of: activating the primary number to cause a dialing of the primary number.

5. The method of claim 1, including the further steps of: selecting the secondary number; and
activating the selected secondary number to cause a dialing of the secondary number.

6. The method of claim 1, the second screen display having a title region and a content region, the method further including the step
displaying the selected name in the title region, and displaying the primary number and the secondary number in the content region.

7. An apparatus for displaying a directory, comprising:
   (a) means for displaying a plurality of names on a first screen display each of the names being associated with a primary number;
   (b) means for selecting one of the names from the first screen display;

(c) means for displaying on a second screen display a primary number associated with the selected name and at least one secondary number; and (d) means for automatically selecting the primary number from the second screen display.

8. The apparatus of claim 7, further comprising:
means for displaying a primary number icon for each of the names.

9. The apparatus of claim 7, further comprising:
means for highlighting the primary number.

10. The apparatus of claim 7, further comprising:
means for activating the primary number to cause a dialing of the primary number.

11. The apparatus of claim 7, further comprising:
means for selecting the secondary number; and
means for activating the selected secondary number to cause a dialing of the secondary number.

12. The apparatus of claim 7, the second screen display having a title region and a content region, the apparatus further including:
means for displaying the selected name in the title region, and displaying the primary number and the secondary number in the content region.

13. A storage device for storing a program, which is readable and executable by a processing circuit to perform the steps of:
(a) displaying a plurality of names on a first screen display, each of the names having associated with it a primary number;
(b) selecting one of the names from the first screen display;
(c) displaying a primary number associated with the selected name and at least one secondary number on a second screen display screen; and
(d) automatically selecting the primary number from the second screen display.

14. The memory device of claim 13, the codes capable of further performing the step of:
displaying a primary number icon for each of the names.

15. The memory device of claim 13, the codes capable of further performing the step of:
highlighting the primary number.

16. The memory device of claim 13, the codes capable of further performing the step of:
activating the primary number to cause a dialing of the primary number.

17. The memory device of claim 13, the codes capable of further performing the steps of:
selecting the secondary number; and
activating the selected secondary number to cause a dialing of the secondary number.

18. The memory device of claim 13, the second screen display having a title region and a content region, the codes capable of further performing the step of:
displaying the selected name in the title region; and
displaying the primary number and the secondary number in the content region.

19. A method of operating a telephone, comprising the steps of:
(a) displaying a plurality of names on a first screen display, each of the names having associated with a primary number;
(b) selecting one of the names from the first screen display;
(c) displaying a primary number associated with the selected name and at least one secondary number on a second screen display; and
(d) automatically selecting the primary number from the second screen display.

20. The method of claim 19, including the further step of:
displaying a primary number icon for each of the names.

21. The method of claim 19, including the further step of:
highlighting the primary number.

22. The method of claim 19, including the further step of:
activating the primary number to cause a dialing of the primary number.

23. The method of claim 19, including the further step of:
selecting the secondary number; and
activating the selected secondary number to cause a dialing of the secondary number.

24. The method of claim 19, the second screen display having a title region and a content region, the method including the further step of:
displaying the selected name in the title region; and
displaying the primary number and the secondary number in the content region.

25. An apparatus for displaying a directory, comprising:
(a) a display screen for displaying a first screen display containing a plurality of names, each of the names having associated with it a primary number; and
(b) a processing circuit, in response to a first selection signal, for selecting one of the names from the first screen display;
wherein the displaying screen displays a second screen display containing a primary number associated with the selected name and at least one secondary number; and
wherein the processing circuit, in response to a second selection signal, automatically selects the primary number from the second screen display.

26. The apparatus of claim 25, the first screen display further containing:
a region for displaying a primary number icon for each of the names.

27. The apparatus of claim 25, wherein the processing circuit also highlights the primary number.

28. The apparatus of claim 25,
wherein the first and second screen displays are displayed on a telephone, and
wherein the processing circuit, in response to an activating signal activates the primary number to cause a dialing of the primary number.

29. The apparatus of claim 25,
wherein the first and second screen displays are displayed on a telephone;
wherein the processing circuit, in response to a third selection signal, selects the secondary number; and
wherein the processing circuit, in response to an activating signal, activates the selected secondary number to cause a dialing of the secondary number.

30. The apparatus of claim 25,
wherein the second screen display has a title region and a content region; and
wherein the processing circuit displays the selected name in the title region, and displays the primary number and the secondary number in the content region.

31. A method of operating a telephone that includes a screen for displaying a first screen display screen and a second screen display, and a processing circuit, the method comprising the steps of:

(a) invoking the first screen display that displays a plurality of names, each of the names being associated with a primary number;

(b) generating a first selection signal to instruct the processing circuit to select one of the names from the first screen display;

(c) invoking the second screen display that displays a primary number associated with the selected name and at least one secondary number; and (d) instructing the processing circuit to automatically select the primary number from the second screen display.

32. The method of claim 31, including the further step of:

displaying a primary number icon for each of the names.

33. The method of claim 31, including the further step of:

highlighting the primary number.

34. The method of claim 31, including the further step of:

generating an activating signal to instruct the processing circuit to activate the primary number to cause a dialing of the primary number.

35. The method of claim 31, including the further steps of:

generating a third signal to instruct the processing circuit to select the secondary number; and generating an activating signal to instruct the processing circuit to activate the selected secondary number to cause a dialing of the secondary number.

36. The method of claim 31, including the further step of:

instructing the processing circuit to display the selected name in the title region, and displaying the primary number and the secondary number in the content region.

37. A telephone comprising:

means for storing a plurality of names;

means for storing a primary number and additional numbers for each of the names;

a display screen;

means for selecting and displaying a sub-set of the plurality of names;

means for selecting one of the sub-set names;

means for displaying the primary number and additional numbers; and means for automatically selecting the primary number for dialing of the primary number.

38. The telephone of claim 37, further comprising:

means for displaying an icon with each of the primary number and with each of the additional number.

39. The telephone of claim 37, further comprising:

means for highlighting the primary number when it is automatically selected.

40. The telephone of claim 37, further comprising:

means for dialing the primary number when it is automatically selected.

41. The telephone of claim 37, further comprising:

means for selecting one of the additional numbers instead of the primary one.

42. The telephone of claim 37, further comprising:

means for dialing the additional number when it is selected.

43. A telephone comprising:

a display screen;

a memory to allow a user to enter names and associated numbers into the memory, including a primary number for each name;

a dial wheel to enable the user to display on the display screen a limited number of names entered into the memory; and wherein the dial wheel is used to select a single name among the displayed names, the primary and additional numbers are displayed, and the primary number is automatically selected for dialing.

44. The telephone of 43, wherein the dial wheel is also used to select a number other than the primary one.

45. A telephone comprising:

a display screen;

a memory to allow a user to enter names and associated numbers into the memory, including a primary number for each name;

means to enable the user to display on the display screen a limited number of names entered into the memory;

means to select a signal name among the displayed names; and means to display the primary and additional numbers and for automatically selecting the primary number for dialing.

46. The telephone of claim 45, further comprising:

means to select a number other than the primary one.

47. The telephone of claim 46, further comprising:

means to display an icon with each of the numbers.

* * * * *

UNITED STATES PATENT AND TRADEMARK OFFICE
CERTIFICATE OF CORRECTION

PATENT NO. : 6,222,921 B1
DATED : April 24, 2001
INVENTOR(S) : Mugura et al.

Page 1 of 1

It is certified that error appears in the above-identified patent and that said Letters Patent is hereby corrected as shown below:

Column 5,
Line 31, delete "defme" and insert therefor -- define --.

Column 6,
Line 58, after "step", insert -- of: --.

Signed and Sealed this

Thirtieth Day of October, 2001

Attest:

NICHOLAS P. GODICI
Attesting Officer
Acting Director of the United States Patent and Trademark Office

UNITED STATES PATENT AND TRADEMARK OFFICE
CERTIFICATE OF CORRECTION

PATENT NO. : 6,222,921 B1  Page 1 of 1
APPLICATION NO. : 09/133070
DATED : April 24, 2001
INVENTOR(S) : Mugura et al.

It is certified that error appears in the above-identified patent and that said Letters Patent is hereby corrected as shown below:

In the CLAIMS:
    Claim 14, column 7, line 39, delete "memory device" and insert --storage device--.
    Claim 14, column 7, line 39, delete "codes" and insert --program--.
    Claim 15, column 7, line 42, delete "memory device" and insert --storage device--.
    Claim 15, column 7, line 42, delete "codes" and insert --program--.
    Claim 16, column 7, line 45, delete "memory device" and insert --storage device--.
    Claim 16, column 7, line 45, delete "codes" and insert --program--.
    Claim 17, column 7, line 49, delete "memory device" and insert --storage device--.
    Claim 17, column 7, line 49, delete "codes" and insert --program--.
    Claim 18, column 7, line 54, delete "memory device" and insert --storage device--.
    Claim 18, column 7, line 55, delete "codes" and insert --program--.
    Claim 45, column 10, line 39, delete "signal" and insert --single--.

Signed and Sealed this

Twenty-ninth Day of June, 2010

David J. Kappos
*Director of the United States Patent and Trademark Office*